(12) United States Patent
Aizawa

(10) Patent No.: US 6,655,216 B1
(45) Date of Patent: Dec. 2, 2003

(54) LOAD TRANSDUCER-TYPE METAL DIAPHRAGM PRESSURE SENSOR

(75) Inventor: Mitsuyoshi Aizawa, Tokyo (JP)

(73) Assignee: Tem-Tech Lab. Co., Ltd., Tokyo (JP)

( * ) Notice: Subject to any disclaimer, the term of this patent is extended or adjusted under 35 U.S.C. 154(b) by 0 days.

(21) Appl. No.: 10/285,472

(22) Filed: Nov. 1, 2002

(30) Foreign Application Priority Data

Jul. 18, 2002 (JP) ........................................ 2002-209379

(51) Int. Cl.[7] ................................................. G01L 7/08
(52) U.S. Cl. ........................ 73/715; 73/862.381; 73/700
(58) Field of Search ............................ 73/715, 862.381, 73/700

(56) References Cited

U.S. PATENT DOCUMENTS

| | | | |
|---|---|---|---|
| 3,696,317 A | * 10/1972 | Farr ................................ | 338/5 |
| 4,854,179 A | * 8/1989 | Haggstrom ............. | 73/862.632 |
| 5,349,873 A | * 9/1994 | Omura et al. ............. | 73/862.68 |
| 5,753,820 A | * 5/1998 | Reed et al. ................... | 73/706 |
| 6,488,367 B1 | * 12/2002 | Debesis et al. ............... | 347/70 |

* cited by examiner

Primary Examiner—Edward Lefkowitz
Assistant Examiner—Andre Allen
(74) Attorney, Agent, or Firm—Wenderoth, Lind & Ponack, L.L.P.

(57) ABSTRACT

There is provided an improved load transducer type metal diaphragm pressure sensor capable of accurately sensing pressures, which is low in cost, easy to fabricate, and suitable for mass-production. The metal diaphragm pressure sensor (1) comprises a disc-shaped metal diaphragm (2) having a pressure element to which a fluid pressure is applied; a strip-shaped beam member (4) of silicone spanning the diaphragm in a direction of the diameter of the diaphragm, said beam member (4) having electrically insulating insulation bases (3) at each of its ends and in its midsection, and being bonded to the metal diaphragm at each of its ends via the insulation bases (3a, 3b); a pin-shaped pivot (5) connected between the midsection of the beam member and the midsection of the metal diaphragm via the insulation base (3c); and a bridge circuit containing diffused resistor elements (6a, 6a'). Deflection of the metal diaphragm under the influence of a fluid pressure to be sensed is transmitted to the beam member via the pivot, so that a change in electrical resistance value of the diffused resistor elements is detected as an electrical signal by the bridge circuit.

7 Claims, 2 Drawing Sheets

LOAD TRANSDUCER-TYPE METAL DIAPHRAGM PRESSURE SENSOR

BACKGROUND OF THE INVENTION

The present invention generally pertains to a pressure sensor and, in particular, to a load transducer-type metal diaphragm pressure sensor suitable for sensing a pressure of a highly corrosive gas used in semiconductor device fabrication processes.

Generally, a pressure sensor for sensing a fluid pressure has, for example, a diaphragm that acts as a pressure sensing element and is configured such that deflection (pressure deformation) of a diaphragm under a fluid pressure applied through a pressure port is converted to an electrical signal, thereby enabling the fluid pressure to be measured.

As a method of sensing deflection of a diaphragm under the influence of a fluid pressure, a load transducing method may be employed, wherein deflection of a diaphragm is first converted to a linear motion by another mechanism and an amount of displacement of the diaphragm detected.

A load transducer-type diaphragm pressure sensor comprises, for example, a strip-shaped beam member made of an elastic metal which spans a disc-shaped diaphragm and is secured at each of its ends to the diaphragm; a pivot in the form of a pin-shaped member which is secured by means of, for example, welding between the midsection of the back side of the disc-shaped diaphragm, to the front side of which a pressure is applied, and the midsection of the beam member; a strain gauge bonded to the back side of the beam member, to the front side of which the pivot is secured, said strain gauge consisting of resistor elements for converting deformation under pressure to electrical resistance; and a bridge circuit for detecting a change in electrical resistance of the strain gauge and outputting the detected change as an electrical signal. In such a load transducer-type diaphragm pressure sensor, stresses produced in the disc-shaped diaphragm as a result of application of fluid pressure are concentrated in the center of the disc-shaped diaphragm, and the resulting vectors cause a linear motion to be generated in a pivot in a direction perpendicular to the surface of the disc-shaped diaphragm, whereby extension stresses act on the beam member. These extension stresses acting on the beam member deform the strain gauge bonded to the beam member, and as the strain gauge is deformed, an electrical resistance varies, which is detected as a function of an applied fluid pressure in the form of an electrical signal by the bridge circuit. Thus, an increase in an amount of displacement of the pivot disposed in the center of the disc-shaped diaphragm is a function of a pressure applied-to the diaphragm, while a decrease in an amount of displacement of the pivot is a function of a reduced pressure with respect to the diaphragm.

As stated, in such a load transducer type diaphragm pressure sensor, stresses produced in a disc-shaped diaphragm are concentrated in the central portion thereof and the resulting vectors translate into a linear motion of the pivot. Therefore, such a load transducer type diaphragm has excellent operation linearity and reproducibility and advantageously is subject to few hysteresis errors.

Further, in such a load transducer type diaphragm pressure sensor, a strain gauge is not directly bonded to the back side of a diaphragm, which results in low thermal conductance of a pressured fluid by the diaphragm with respect to the strain gauge and therefore, a pressure can be measured accurately with any influence of temperature drift caused by the strain gauge on a detected signal being kept minimal.

However, in a conventional load transducer type diaphragm pressure sensor such as described above, a strip-shaped beam member made of elastic metal is welded to each end of a diaphragm and a pivot is also welded between the midsection of the beam member and the midsection of the diaphragm. Such a configuration of a conventional load transducer type diaphragm pressure sensor requires precise welding processes to be carried out at the time of fabrication, and this translates into high manufacturing costs.

Further, as a strain gauge in a conventional load transducer type diaphragm pressure sensor is manually bonded directly to a metal beam member, not only is it difficult to accurately position the strain gauge to be bonded but also specialized skills unsuited to mass production are required. Still further, as a strain gauge and a beam member are bonded using an adhesive, characteristics of the strain gauge are subject to change while the adhesive is being cured during a bonding process, which makes it impossible for a sensor to detect a pressure with a high degree of precision.

SUMMARY OF THE INVENTION

Given the aforementioned problems of a conventional load transducer type diaphragm pressure sensor, it is an object of the present invention to provide an improved load transducer type metal diaphragm pressure sensor with a high degree of precision which is relatively uncomplicated and low in cost and can be easily mass-produced.

According to the present invention, a load transducer type metal diaphragm pressure sensor for sensing a fluid pressure comprises: a disc-shaped metal diaphragm having on one side a pressure portion to which a fluid pressure is applied and further having an annular-shaped frame integrated with the metal diaphragm on the reverse side; a strip-shaped silicone beam member which spans the diaphragm in a direction of a diameter of the annular-shaped frame, and has electrically insulating insulation bases provided on each of its ends as well as in its midsection, and is further bonded to the frame of the metal diaphragm via the insulation bases at each of its ends; a pin-shaped pivot connected between the midsection of the beam member and the midsection of the metal diaphragm via the insulation base on the reverse side of the metal diaphragm; and a bridge circuit containing diffused resistor elements functioning as a pre-formed strain gauge on the side of the beam member opposite to the side where the pivot is connected.

In such a load transducer type metal diaphragm pressure sensor, deflection of a metal diaphragm under the influence of fluid pressure to be sensed is transmitted to a beam member via a pivot, so that a change in electrical resistance of diffused resistor elements is detected as an electrical signal by the bridge circuit.

According to the present invention, a strip-shaped beam member containing a bridge circuit is made of a thin silicone film. Therefore, compared to a conventional metal beam member, the strip-shaped beam member of the present invention has a higher resistance change rate with respect to a stress change. Thus, the present invention is able to provide a load transducer type diaphragm pressure sensor that is both highly sensitive and precise.

According to the present invention, a strip-shaped beam member is made of a thin silicone film. Therefore, the present sensor can be mass-produced by means of batch process similar to silicone semiconductor device fabrication processes. Thus, the present invention can provide a pressure sensor at a low cost and its fabrication process does not require a specialized manual operation for bonding a strain gauge, thereby eliminating problems of poor bonding and strain gauge positioning error. As will be clear from the above, then, the present invention provides a pressure sensor that is easy to fabricate.

According to the present invention, beam members can be mass-produced by using thin silicone films. Thus, by simply adjusting only a thickness of a metal diaphragm which has a simple structure and can be readily fabricated while using the same beam member, the present invention can provide a versatile pressure sensor whose measurable pressure ratings can be freely changed.

DETAILED DESCRIPTION OF THE INVENTION

Figure 1:
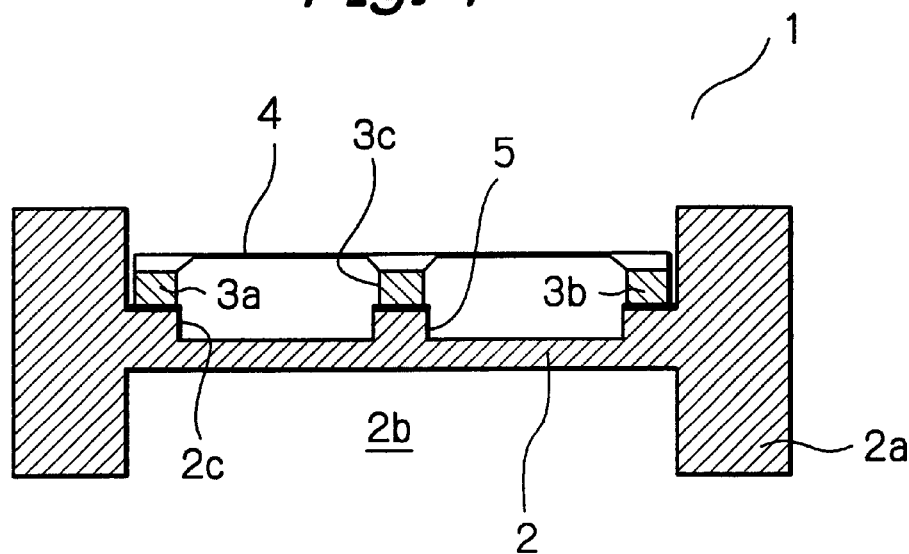
FIG. 1 is a central cross section showing a principal configuration of an embodiment of a load transducer type metal diaphragm pressure sensor in accordance with the present invention.
Figure 2:
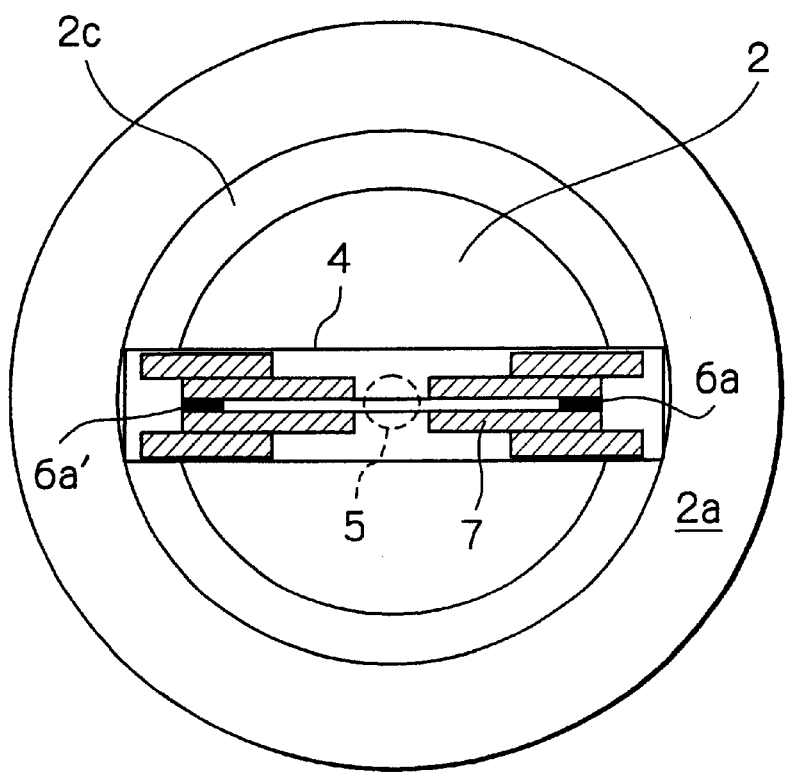
FIG. 2 is a plan view indicating a principal configuration of the embodiment of a load transducer type metal diaphragm pressure sensor in accordance with the present invention.
Figure 3:
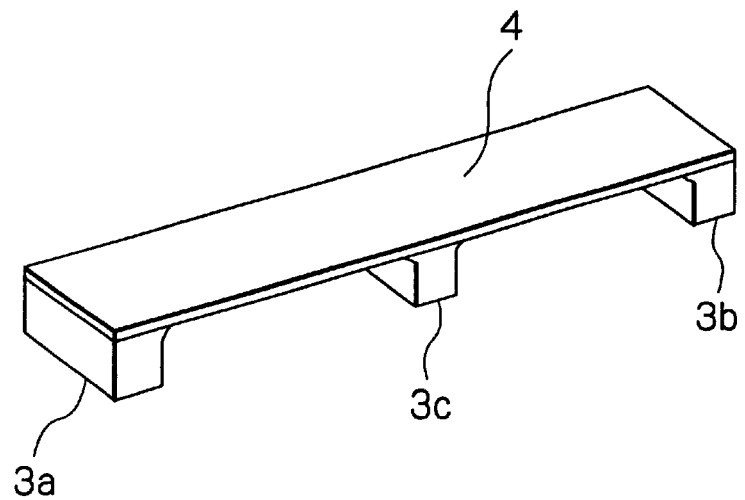
FIG. 3 is a perspective of a beam member having the insulation bases indicated in FIGS. 1 and 2.

FIGS. 1, 2 and 3 indicate a principal configuration of an embodiment of the load transducer type diaphragm pressure sensor 1 of the present invention. More specifically, FIG. 1 is a central cross section of the diaphragm pressure sensor 1, FIG. 2 being a plan view thereof and FIG. 3 being a perspective of a part thereof.

As is indicated in the drawings, the diaphragm sensor 1 mainly comprises the disc-shaped diaphragm 2 made of a sheet metal having the annular-shaped frame 2c and a strip-shaped beam member 4 having electrically insulating insulation bases 3. The diaphragm 2, insulation bases 3 and beam member 4 are housed in a housing member (not indicated in the drawing) made of a material, which resists attack by a fluid whose pressure is detected, and subjected to pressurized gas in, for example, a semiconductor device fabrication process. The concave portion 2b formed inside the flange 2a of the diaphragm 2 constitutes the pressure portion to which a pressure of a fluid such as gas, etc. is applied.

Inside the flange 2a, the annular-shaped frame 2c made of the same metal material as the flange 2a is formed concentrically with respect to the flange 2a in such a manner as to be integrated with the flange 2a.

The beam member 4 comprises electrically insulating heat-resistant glass provided at each of its ends and in its midsection, for example, insulation bases 3 (3a, 3b, 3c) made of Pyrex (registered trademark) glass. On the side of the diaphragm 2 opposite to the side having the pressure portion (concave portion 2b), the insulation bases 3a and 3b provide electrical insulation between the diaphragm 2 made of a metal sheet and the beam member 4 which, as will be described later, is made of a conductive thin silicone film whereas the insulation base 3c in the midsection also provides electrical insulation between the pivot 5 (which will be described later) and the beam member 4, so that a current does not leak from the beam member 4 to the diaphragm 2.

The strip-shaped beam member 4 is made of a material that is highly sensitive to stress changes, and which is suitable for mass production, for example, a thin silicone film. More specifically, strips of beam members are annealed on a silicone wafer to constitute the strip-shaped beam member 4. Further, a diffused resistor element and a silicone monocrystal conductor, which constitute a bridge circuit, are formed on each of the strips of beam members formed on the silicone wafer.

The beam member 4 spans the diaphragm 2 in a direction of the diameter of the annular-shaped frame 2c of the diaphragm 2, that is, in the direction of the diameter of the diaphragm 2, and is bonded to the frame 2c at each of its ends via the insulation bases 3a and 3b. The beam member 4 is connected to the midsection of the side of the diaphragm 2 opposite to the side having the pressure portion via the insulation base 3c, which is at the midsection of the beam member 4.

Further, on the side of the beam member 4 opposite to the side where the pivot 5 is connected are disposed at intervals at least two diffused resistor elements 6a and 6a' functioning as a strain gauge, i.e., in which a distance between atoms changes with stress and as a result, an electrical resistance value changes (piezoresistance effect). The diffused resistor elements 6a and 6a' and the silicone monocrystal conductor 7 constitute a full-bridge circuit. The diffused resistor elements 6a and 6a' are disposed at such positions adequate to show a resistance change proportional to a change in stress applied to the beam member 4 and attain sufficient detection sensitivity.

According to the diaphragm pressure sensor 1 having the above construction, stresses produced in the pressure portion (concave portion 2b) of the disc-shaped diaphragm 2 are concentrated in the central portion of the disc-shaped diaphragm 2 and the resultant of their vectors causes the pivot 5 to generate a linear motion perpendicular to the surface of the diaphragm 2, which produces extension stresses in the beam member 4. The extension stresses in the beam member 4 deform the diffused resistor elements 6a and 6a' formed on the beam member 4, and the electrical resistance which changes as the elements 6a and 6a' are deformed is detected in the form of an electrical signal by the bridge circuit as a function of applied fluid pressure. Thus, an ascending amount of displacement of the pivot 5 disposed in the center of the disc-shaped diaphragm 2 is a function of an applied pressure, whereas a descending amount of displacement of the pivot 5 is a function of a reduced pressure with respect to the diaphragm 2, whereby fluid pressure applied to the diaphragm 2 can be measured.

What is claimed is:

1. A load transducer-type metal diaphragm pressure sensor for sensing a fluid pressure characterized by comprising:

a disc-shaped metal diaphragm having a pressure element to which a fluid pressure is applied;

a strip-shaped beam member of silicone spanning said metal diaphragm in a direction of its diameter, said beam member being provided with electrical insulating bases at each of its ends and in its midsection, and being bonded to said metal diaphragm through said insulating bases at each of its said ends:

a pin-shaped pivot connected between the midsection of said beam member and the midsection of said metal diaphragm through said insulating base on a side of said metal diaphragm opposite to the side having said pressure element; and a bridge circuit including diffused resistor elements functioning as a pre-formed strain gauge on a side of said beam member opposite to the side where said beam member is connected to said pivot, whereby said metal diaphragm pressure sensor being characterized in that deflection of said metal diaphragm under the influence of a fluid pressure to be sensed is transmitted to said beam member through said pivot, so that a change in resistance value of said diffused resistor elements is detected as an electrical signal by said bridge circuit.

2. The metal diaphragm pressure sensor as defined in claim 1, wherein said insulating bases comprise heat-resistance glass.

3. The metal diaphragm pressure sensor as defined in claim 1, wherein said strip-shaped beam member is annealed on a silicone wafer.

4. The metal diaphragm pressure sensor as defined in claim 1, wherein a thickness of said metal diaphragm is adjusted so as to freely change a measurable pressure rating.

5. The metal diaphragm pressure sensor as defined in claim 2, wherein said strip-shaped beam member is annealed on a silicone wafer.

6. The metal diaphragm pressure sensor as defined in claim 2, wherein a thickness of said metal diaphragm is adjusted so as to freely change a measurable pressure rating.

7. The metal diaphragm pressure sensor as defined in claim 3, wherein a thickness of said metal diaphragm is adjusted so as to freely change a measurable pressure rating.

* * * * *